United States Patent [19]

Araujo

[11] 4,439,528
[45] Mar. 27, 1984

[54] SPONTANEOUS OPAL GLASS COMPOSITIONS

[75] Inventor: Roger J. Araujo, Big Flats, N.Y.

[73] Assignee: Corning Glass Works, Corning, N.Y.

[21] Appl. No.: 500,565

[22] Filed: Jun. 2, 1983

[51] Int. Cl.$^3$ .......................... C03C 3/04; C03C 3/10; C03C 3/30
[52] U.S. Cl. ...................................... 501/32; 501/57; 501/70; 501/72
[58] Field of Search .................... 501/32, 57, 70, 72

[56] References Cited

U.S. PATENT DOCUMENTS

| | | | |
|---|---|---|---|
| 3,275,492 | 9/1966 | Herbert | 501/64 |
| 3,661,601 | 5/1972 | Dumbaugh et al. | 501/59 |
| 3,681,098 | 8/1972 | Dumbaugh et al. | 501/57 |
| 4,311,529 | 1/1982 | Danielson et al. | 501/32 |
| 4,323,653 | 4/1982 | Holland et al. | 501/32 |

FOREIGN PATENT DOCUMENTS 1315828 5/1973 United Kingdom ................. 501/32

*Primary Examiner*—Mark Bell
*Attorney, Agent, or Firm*—C. S. Janes, Jr.

[57] ABSTRACT

The present invention is directed to the production of spontaneous opal glasses exhibiting softening points in excess of 750° C., a coefficient of thermal expansion between about 60–90×10$^{-7}$/°C., a crystal liquidus temperature below 1350° C., a liquidus viscosity of at least 200 poises, and excellent resistance to attack by alkalies. Spherically-shaped glassy droplets constitute the opal phase in the glasses which consist essentially, in weight percent, of

| | | | |
|---|---|---|---|
| $SiO_2$ | 50–72 | $Na_2O$ | 0–8 |
| CaO | 10–40 | $Al_2O_3$ | 0–2 |
| ZnO | 4–40 | F | 0–5 |

3 Claims, No Drawings

SPONTANEOUS OPAL GLASS COMPOSITIONS

BACKGROUND OF THE INVENTION

A glass comprised of two or more finely-dispersed phases of differing refractive indices scatters an appreciable quantity of visible light. When in sufficient thickness such glasses can exhibit complete opacity even though they absorb virtually no visible light. Such glasses, termed opals, are well known in the glass industry for the fabrication of products as diverse as lantern globes and dinner dishes.

Opacity in glasses is normally achieved through one of two mechanisms or as a result of a combination of those two mechanisms. The first means of light scattering involves the presence of a small amount of material suspended in the glass which has an index of refraction differing very markedly from that of the base glass phase. In the second mechanism the phases present may differ less in index, but where the suspended phase constitutes a major proportion of the body, the high number of interfaces occurring gives rise to extensive light scattering with consequent opacity. Either mechanism may involve suspensions of crystals in a glassy matrix or suspensions comprising two immiscible glassy phases.

Opal glasses have also been classified by the glass manufacturer according to the method of production. For example, where the kinetics of phase separation are so rapid that opacity occurs during the quick cooling of a glass body characteristic of the conventional glass forming processes, spontaneous opals are stated to result. In contrast, where the kinetics of phase separation are so slow that the glass body must be maintained for a substantial length of time within a temperature interval wherein phase separation takes place at a finite rate, the resultant products are termed reheat or thermally opacifiable opals. As can be readily appreciated, the need for a separate heat treating step significantly increases the production cost of reheat opal glasses.

The primary objective of the present invention is to provide an opal glass demonstrating a very high degree of opacity suitable for use as dinnerware. That utility impresses several constraints upon the character and means of production of the glass. To illustrate, the operable compositions will form spontaneous opals so that the expense of special heat treating procedures to secure the desired opacity will be eliminated. The glass must resist chemical attack by alkalies present in commonly used dishwashing materials. Prolonged and/or repeated exposure of the glass must neither remove the gloss from the surface of the dish nor cause a degree of porosity in the surface which can result in the absorption of foreign substances with consequent staining. Most preferably, the glass will be compatible with currently conventional decorating techniques. That circumstance demands a coefficient of thermal expansion of between about $60-90\times10^{-7}/°C.$ and a softening point in excess of 750° C. Furthermore, it is highly desirable that the glass not be excessively heated when used in a microwave oven. Inasmuch as occlusions having diameters no larger than 75 microns can initiate breakage when the glass article is exposed to thermal shock, the particles suspended in the base glass matrix must not approach that size.

In order to forestall excessive corrosion of the molds used in the formation of glass article, the crystal liquidus temperature will be less than 1350° C. by as large an increment as possible. For the same reason, any inclusion of fluorine will be in small amounts, viz., less than 5% by weight. Moreover, because fluorine is relatively volatile and, hence, pollutes the air to a certain extent, it is preferred that the fluorine level be held as low as possible, ideally zero. For convenience in forming glass articles, the viscosity of the glass at the liquidus temperature will exceed 200 poises.

SUMMARY OF THE INVENTION

It is well known in the glass art that in numerous instances alkaline earth metal silicate glasses can exhibit very dense opacities because of the very broad regions of immiscibility in the binary systems. The present invention is founded in my discovery that the addition of zinc to calcium silicate opal glass compositions markedly enhances the chemical durability thereof. Whereas previous researchers have disclosed useful opal glasses containing silica and the alkaline earths, those glasses are unlike the products of the instant invention either because they owe their opacity to calcium fluoride crystals and are not as opaque as the present glasses, or because they contain appreciable amounts of boron and do not display the desired durability.

I have found that the above objective can be achieved with glass compositions consisting essentially, expressed in terms of weight percent on the oxide basis, of about

| | |
|---|---|
| $SiO_2$ | 50–72 |
| CaO | 10–40 |
| ZnO | 4–40 |
| $Na_2O$ | 0–8 |
| $Al_2O_3$ | 0–2 |
| F | 0–5 |

Such compositions yield spontaneous opal glasses of dense opacity, excellent resistance to attack by alkalies such as are found in dishwasher detergents, coefficients of thermal expansion (25°–300° C.) between about $60-90\times10^{-7}/°C.$, softening points in excess of 750° C., crystal liquidus temperatures below 1350° C., liquidus viscosities in excess of 200 poises, and wherein the opacity results from spherically-shaped droplets of an immiscible glassy phase having diameters of less than one micron.

PRIOR ART

U.S. Pat. No. 3,275,492 describes the production of spontaneous and reheat opal glasses of borosilicate-based compositions consisting essentially, in mole percent, of:

| | |
|---|---|
| $SiO_2$ | 66–81 |
| $B_2O_3$ | 10–27 |
| $Li_2O$ and/or $Na_2O$ and/or $K_2O$ | 1–7 |
| $Al_2O_3$ | 0–1 |
| Opacifying Agents | 3–24 |

The opacifying agents include one or more of BaO, CaO, CoO, CuO, MgO, MnO, NiO, and ZnO. There is no definition of the character of the opacifying phase; the text merely alludes to diffusing particles.

U.S. Pat. No. 3,661,601 is directed to the manufacture of spontaneous opal glasses wherein the opacity is caused by the presence of fluoride-containing droplets of an immiscible glassy phase. The glasses consist essentially, in weight percent, of:

| | | | |
|---|---|---|---|
| SiO$_2$ | 50–75 | Na$_2$O | 0–7 |
| Al$_2$O$_3$ | 3–9 | K$_2$O | 0–7 |
| CaO | 11–20 | Na$_2$O + K$_2$O | 3–10 |
| B$_2$O$_3$ | 1–7 | F | 2–4 |

Up to 10% total of at least one oxide of the following group may optionally be included: BaO, Bi$_2$O$_3$, CeO$_2$O, GeO$_2$, La$_2$O$_3$, Nb$_2$O$_5$, P$_2$O$_5$, PbO, SrO, TiO$_2$, and ZnO.

U.S. Pat. No. 3,681,098 is drawn to the formation of spontaneous opal glasses wherein the opacity is generated through the presence of fluoride-containing droplets of an immiscible glassy phase and CaF$_2$ crystals. The glasses consist essentially, in weight percent, of:

| | |
|---|---|
| SiO$_2$ | 50–75 |
| Al$_2$O$_3$ | 3–14 |
| CaO | 10–20 |
| Na$_2$O | 0–7 |
| K$_2$O | 0–7 |
| Na$_2$O + K$_2$O | 3–10 |
| MoO$_3$ and/or WO$_3$ and/or As$_2$O$_3$ | 0.25–5 |
| F | 2–5 |

Up to 10% total of at least one oxide of the following group may optionally be included: B$_2$O$_3$, BaO, MgO, P$_2$O$_5$, PbO, SrO, TiO$_2$, ZnO, and ZrO$_2$.

U.S. Pat. No. 4,311,529 discloses the tinting of spontaneous opal glasses wherein CaF$_2$ crystals constitute the opacifying phase. The base glass compositions consist essentially, in weight percent, of:

| | | | |
|---|---|---|---|
| SiO$_2$ | 57–61 | ZnO | 8–10 |
| Al$_2$O$_3$ | 10–11 | Na$_2$O | 8–9 |
| B$_2$O$_3$ | 1–2 | K$_2$O | 2–2.5 |
| CaO | 5–6.5 | F | 3–4 |

British Pat. No. 1,315,828 cites spontaneous borosilicate-based opal glasses wherein an unidentified immiscible glassy phase gives rise to the opacity. The glasses consist essentially, in weight percent, of:

| | | | |
|---|---|---|---|
| SiO$_2$ | 60–75 | Al$_2$O$_3$ | 2–7 |
| B$_2$O$_3$ | 8–15 | ZrO$_2$ | 0–2.5 |
| RO | 9–17 | TiO$_2$ | 0–4 |
| R$_2$O | 3–7 | F | 1–4 |

RO consists of at least one oxide from the group BaO, CaO, MgO, SrO, and ZnO, and R$_2$O consists of at least one oxide from the group of Li$_2$O, Na$_2$O, and K$_2$O. In the preferred glasses CaO comprises at least 60% of the RO content and Na$_2$O comprises at least 75% of the R$_2$O content.

DESCRIPTION OF PREFERRED EMBODIMENTS

Tables I–XIII report examples of glass compositions, expressed in terms of parts by weight on the oxide basis, illustrating the parameters of the present invention. Inasmuch as the sum of the tabulated components totals or approximately totals 100, for all practical purposes the individual values of the recorded constituents may be deemed to reflect weight percent. In accordance with conventional glass analysis practice, where fluorine was utilized in the glass batch materials, it is recited as the entity, fluoride, since it is not known with which cation it is bonded. Tables IA–XIIIA report the compositions in terms of cation percent. In certain instances comparisons of compositional variations becomes more clear when viewed on a cation basis than on a simple weight percent basis. The actual ingredients for the glass batches may comprise any materials, either oxides or other compounds, which, when melted together, will be converted into the desired oxides in the proper proportions.

Batches of about 800 grams were compounded, thoroughly mixed together, and charged into platinum crucibles. After covering, the crucibles were introduced into a furnace operating at about 1600° C. and the batches melted for about six hours. Part of the melt was run through steel rollers to form thin ribbon, i.e., glass ribbon having a thickness of about 0.5 mm, to determine the opacity generated in a glass forming operation involving rapid chilling. The remainder of the melt was poured onto a steel plate to produce a generally rectangular glass patty which was then immediately transferred to an annealer operating at about 650° C.

Small samples of the glasses were placed into thin platinum boats through which an electrical current was passed to melt the glass. When the current is turned off, the melt cools very rapidly. This practice permits the temperature at which opalization occurs, also known as the opal liquidus (op. liq.), to be measured utilizing laser reflectance techniques.

The following procedure was devised to evaluate the resistance of the inventive opal glasses to commercial dishwasher detergents. A 0.3% by weight aqueous solution of SUPER SOILAX ® detergent, manufactured by Economics Laboratories, St. Paul, Minn., is prepared. The solution is heated to 95° C. and samples of the glass immersed therein, the surface area of the samples being limited by the ratio of 12 square inches to one pound of the solution. The samples are withdrawn from the solution at 24-hour intervals up to 96 hours, rinsed in tap water, and wiped dry. The gloss of each sample was compared visually to reference samples. The porosity induced in the glass through attack by the alkalies present in the detergent was determined in the following manner. A drop of SPOTCHECK ® dye penetrant, marketed by Magnaflux Corporation, Chicago, Ill., was allowed to stand on the glass surface for 20 seconds. If the coloration could be completely removed by wiping the surface with a cloth moistened with the above SUPER SOILAX ® detergent solution, the sample was rated "A". If the coloration could be completely removed after rubbing the surface with a cloth and a household cleansing powder for about 30 seconds, the sample was rated "B". Persistence of the stain after this latter treatment results in the sample being rated "C". To be deemed acceptable, the glass must show no loss of gloss and be rated "A" after an exposure to the detergent of 96 hours.

Although the above-identified test comprises the ultimate criterion for the acceptable utility of an opal glass for dinnerware, its qualitative character does not provide the researcher with a screening procedure for relatively rapidly detecting minor differences between samples. Therefore, a quantitative measure of resistance to alkalies was devised via the determination of the loss of weight (mg/cm$^2$) experienced by a sample after an immersion for six hours in an aqueous 0.2 N solution of Na$_2$CO$_3$ maintained at 95° C. A weight loss (wt. loss) of no more than 0.1 mg/cm$^2$ has been found acceptable with the preferred maximum being no more than 0.05 mg/cm$^2$.

Measurements of softening point (S.P.) in °C., coefficient of thermal expansion (Exp.) over the range of 25°–300° C. in terms of $\times 10^{-7}$/°C., crystal liquidus (cry. liq.) in °C., and the viscosity (vis.) of the glass at its crystal liquidus in terms of poises were conducted in accordance wit techniques conventional in the glass art. Opal density (Op. Den.) was evaluated visually.

Tables I and IA illustrate spontaneous opal glass compositions in the $CaO\text{-}Al_2O_3\text{-}B_2O_3\text{-}SiO_2$ system of the type known to the prior art. The weight loss data unequivocally demonstrate the poor resistance to alkalies exhibited by those glasses, thereby rendering them unsuitable for tableware.

TABLE I

|  | 1 | 2 | 3 | 4 | 5 | 6 | 7 |
|---|---|---|---|---|---|---|---|
| $SiO_2$ | 67.6 | 68.1 | 68.5 | 63.3 | 62.6 | 63.0 | 63.5 |
| $Al_2O_3$ | 6.62 | 4.44 | 2.24 | 8.95 | 6.64 | 4.46 | 2.24 |
| $B_2O_3$ | 1.51 | 3.03 | 4.58 | 3.06 | 1.51 | 3.04 | 4.60 |
| CaO | 24.3 | 24.4 | 24.6 | 24.6 | 29.2 | 29.4 | 29.6 |
| $mg/cm^2$ | 0.16 | 0.25 | 0.37 | 0.17 | 0.19 | 0.25 | 0.36 |

TABLE IA

|  | 1 | 2 | 3 | 4 | 5 | 6 | 7 |
|---|---|---|---|---|---|---|---|
| $SiO_2$ | 65.0 | 65.0 | 65.0 | 60.0 | 60.0 | 60.0 | 60.0 |
| $Al_2O_3$ | 7.5 | 5.0 | 2.5 | 10.0 | 7.5 | 5.0 | 2.4 |
| $B_2O_3$ | 2.5 | 5.0 | 7.5 | 5.0 | 2.4 | 5.0 | 7.5 |
| CaO | 25.0 | 25.0 | 25.0 | 25.0 | 30.0 | 30.0 | 30.0 |

Tables II and IIA reveal that the replacement of $SiO_2$ by ZnO improves the resistance of calcium silicate opal glasses to attack by alkalies. An examination of Examples 11–13 evidences a similar effect in glasses containing $Na_2O$. Those Examples also dramatize the profound difference in resistance to alkali attack between replacing $SiO_2$ with ZnO and replacing $SiO_2$ with additional CaO. Finally, Examples 11–13 further illustrate that ZnO does not adversely affect the kinetics of opal information. At high temperatures ZnO appears to suppress phase separation, but during rapid cooling the opal phase "strikes in" at a very convenient temperature.

TABLE II

|  | 8 | 9 | 10 | 11 | 12 | 13 |
|---|---|---|---|---|---|---|
| $SiO_2$ | 64.5 | 60.8 | 57.1 | 72.9 | 66.5 | 67.9 |
| CaO | 35.4 | 35.0 | 34.6 | 24.3 | 23.9 | 29.3 |
| ZnO | — | 4.12 | 8.14 | — | 6.93 | — |
| $Na_2O$ | — | — | — | 2.69 | 2.64 | 2.69 |
| $mg/cm^2$ | 0.24 | 0.09 | 0.06 | 0.23 | 0.05 | 0.24 |
| Op. Liq. | — | — | — | 1400 | 1140 | 1200 |
| Cry. Liq. | — | — | — | 1365 | 1300 | 1360 |

TABLE IIA

|  | 8 | 9 | 10 | 11 | 12 | 13 |
|---|---|---|---|---|---|---|
| $SiO_2$ | 63 | 60 | 57 | 70 | 65 | 65 |
| CaO | 37 | 37 | 37 | 25 | 25 | 30 |
| ZnO | — | 3 | 6 | — | 5 | — |
| $Na_2O$ | — | — | — | 5 | 5 | 5 |

Tables III and IIIA manifest that, in spite of its similarity in size and charge to zinc, the inclusion of magnesium does not impart an equal improvement in alkali resistance to the glasses.

TABLE III

|  | 14 | 15 | 16 | 17 |
|---|---|---|---|---|
| $SiO_2$ | 66.3 | 68.9 | 66.5 | 68.9 |
| CaO | 23.8 | 24.7 | 22.9 | 23.7 |

TABLE III-continued

|  | 14 | 15 | 16 | 17 |
|---|---|---|---|---|
| ZnO | 6.91 | — | 6.92 | — |
| MgO | — | 3.55 | — | 3.55 |
| $Na_2O$ | 2.50 | 2.60 | 2.37 | 2.46 |
| $Al_2O_3$ | 0.217 | 0.23 | 1.30 | 1.35 |
| $mg/cm^2$ | 0.05 | 0.22 | 0.01 | 0.21 |

TABLE IIIA

|  | 14 | 15 | 16 | 17 |
|---|---|---|---|---|
| $SiO_2$ | 65.0 | 65.0 | 65.0 | 65.0 |
| CaO | 25.0 | 25.0 | 24.0 | 24.0 |
| ZnO | 5.0 | — | 5.0 | — |
| MgO | — | 5.0 | — | 5.0 |
| $Na_2O$ | 4.75 | 4.75 | 4.5 | 4.5 |
| $Al_2O_3$ | 0.25 | 0.25 | 1.5 | 1.5 |

That the beneficial effect upon alkali resistance exerted by ZnO is not limited to glasses containing CaO as the sole alkaline earth metal oxide can be observed in Tables IV and IVA where, on a cation percent basis, the glasses contain equal quantities of CaO and SrO.

TABLE IV

|  | 18 | 19 | 20 | 21 |
|---|---|---|---|---|
| $SiO_2$ | 58.2 | 57.0 | 58.1 | 57.0 |
| CaO | 12.7 | 12.5 | 10.6 | 10.4 |
| SrO | 23.5 | 23.1 | 19.6 | 19.2 |
| ZnO | — | — | 6.15 | 6.03 |
| $Na_2O$ | 2.11 | 2.07 | 2.11 | 2.07 |
| $Al_2O_3$ | 1.15 | 1.14 | 1.15 | 1.14 |
| F | 1.95 | 3.84 | 1.95 | 3.84 |
| $mg/cm^2$ | 0.42 | 0.43 | 0.10 | 0.08 |
| Cry. Liq. | 1300 | 1325 | 1334 | 1370 |

TABLE IVA

|  | 18 | 19 | 20 | 21 |
|---|---|---|---|---|
| $SiO_2$ | 62.74 | 61.54 | 62.74 | 61.53 |
| CaO | 14.71 | 14.42 | 12.26 | 12.02 |
| SrO | 14.71 | 14.42 | 12.26 | 12.02 |
| ZnO | — | — | 4.90 | 4.81 |
| $Na_2O$ | 4.41 | 4.33 | 4.41 | 4.33 |
| $Al_2O_3$ | 1.47 | 1.44 | 1.47 | 1.44 |
| F | 1.96 | 3.85 | 1.96 | 3.85 |

Tables V and VA indicate that high levels of ZnO enhance the resistance of the glasses to alkali attack even at relatively low $SiO_2$ values. Moreover, in glasses containing such low levels of $SiO_2$, ZnO not only improves the alkali resistance thereof but also the density of opacity. Nevertheless, it must be noted that the inclusion of fluoride in glasses of low silica contents deleteriously affects the alkali resistance of such glasses even when high levels of ZnO are present.

TABLE V

|  | 22 | 23 | 24 |
|---|---|---|---|
| $SiO_2$ | 54.2 | 51.1 | 53.2 |
| CaO | 26.7 | 12.3 | 26.1 |
| ZnO | 19.0 | 36.5 | 18.6 |
| F | — | — | 1.96 |
| $mg/cm^2$ | 0.10 | 0.03 | 0.20 |
| Op. Den. | Clear | Dense | Dense |

TABLE VA

|  | 22 | 23 | 24 |
|---|---|---|---|
| $SiO_2$ | 56.0 | 56.0 | 54.9 |
| CaO | 29.5 | 14.5 | 14.2 |
| ZnO | 14.5 | 29.5 | 28.9 |

TABLE VA-continued

|   | 22 | 23 | 24 |
|---|---|---|---|
| F | — | — | 2.0 |

Tables VI and VIA illustrate the flexibility available in adjusting the content of alkali metal and/or alkaline earth metal to increase the coefficient of thermal expansion of the glass with minimal effect upon alkali resistance. For example, a slight increase in the level of CaO at the expense of $SiO_2$ raises the expansion coefficient with only a slight reduction in alkali resistance. Unfortunately, a concomitant effect is a sacrifice in the density of the opacity. Opal density can be restored, however, through the addition of fluoride. And because of the high $SiO_2$ contents of the glasses, this addition of fluoride does not have a markedly adverse effect upon alkali resistance.

TABLE VI

|   | 12 | 25 | 26 | 27 | 28 | 29 | 30 |
|---|---|---|---|---|---|---|---|
| $SiO_2$ | 66.5 | 64.5 | 61.6 | 59.8 | 65.8 | 64.7 | 62.8 |
| CaO | 23.9 | 25.8 | 28.7 | 27.9 | 24.0 | 24.2 | 23.5 |
| ZnO | 6.93 | 6.94 | 6.9 | 6.7 | 6.96 | 7.0 | 6.8 |
| $Na_2O$ | 2.64 | 2.64 | 2.65 | 2.57 | 3.18 | 4.0 | 3.89 |
| F | — | — | — | 2.91 | — | — | 2.94 |
| $mg/cm^2$ | 0.05 | 0.07 | — | 0.06 | 0.05 | — | 0.06 |
| Op. Den. | Dense | Dense | Clear | Dense | Medium | Light | Dense |
| Exp. | 67 | 70 | — | 76.1 | 70 | — | 73.2 |

TABLE VIA

|   | 12 | 25 | 26 | 27 | 28 | 29 | 30 |
|---|---|---|---|---|---|---|---|
| $SiO_2$ | 65.0 | 63.0 | 60.0 | 58.3 | 64.0 | 62.5 | 60.7 |
| CaO | 25.0 | 27.0 | 30.0 | 29.1 | 25.0 | 25.0 | 24.3 |
| ZnO | 5.0 | 5.0 | 5.0 | 4.9 | 5.0 | 5.0 | 4.9 |
| $Na_2O$ | 5.0 | 5.0 | 5.0 | 4.9 | 6.0 | 7.5 | 7.3 |
| F | — | — | — | 2.8 | — | — | 2.8 |

Tables VII and VIIA and Tables VIII and VIIIA provide further illustrations of varying the alkali metal contents of the glasses to yield articles of acceptable resistance to alkalies. For example, $Li_2O$ can replace part of the $SiO_2$ without undue reduction in alkali resistance. $K_2O$ can be utilized as part of the alkali metal content and its use appears to enhance the alkali resistance of the glass. Nevertheless, its effect upon phase separation is very profound such that the restoration of opacity demands greater fluoride levels than are desirable.

TABLE VII

|   | 31 | 32 | 33 |
|---|---|---|---|
| $SiO_2$ | 66.5 | 66.0 | 65.4 |
| CaO | 22.9 | 24.1 | 23.3 |
| ZnO | 6.92 | 6.98 | 7.03 |
| $Na_2O$ | 2.37 | 1.06 | 2.41 |
| $Li_2O$ | — | 0.71 | 0.52 |
| $Al_2O_3$ | 1.30 | 1.09 | 1.32 |
| $mg/cm^2$ | 0.01 | 0.05 | 0.05 |
| Cry. Liq. | 1410 | 1420 | 1370 |
| Op. Den. | Dense | Dense | Dense |

TABLE VIIA

|   | 31 | 32 | 33 |
|---|---|---|---|
| $SiO_2$ | 65.0 | 64.0 | 63.0 |
| CaO | 24.0 | 25.0 | 24.0 |
| ZnO | 5.0 | 5.0 | 5.0 |
| $Na_2O$ | 4.5 | 2.0 | 4.5 |
| $Li_2O$ | — | 2.75 | 2.0 |
| $Al_2O_3$ | 1.5 | 1.25 | 1.5 |

Substituting CaO for $Na_2O$ has no significant deleterious effect. Replacing a small amount of CaO with $SiO_2$ does not appear to improve alkali resistance, whereas substituting $SiO_2$ for $Na_2O$ significantly enhances alkali resistance.

TABLE VIII

|   | 12 | 34 | 35 | 36 |
|---|---|---|---|---|
| $SiO_2$ | 66.5 | 66.0 | 68.4 | 67.5 |
| CaO | 23.9 | 25.1 | 21.9 | 23.7 |
| ZnO | 6.93 | 6.88 | 6.91 | 6.87 |
| $Na_2O$ | 2.64 | 1.83 | 2.63 | 1.83 |
| $mg/cm^2$ | 0.05 | 0.07 | 0.06 | 0.01 |

TABLE VIIIA

|   | 12 | 34 | 35 | 36 |
|---|---|---|---|---|
| $SiO_2$ | 65.0 | 65.0 | 67.0 | 66.5 |
| CaO | 25.0 | 26.5 | 23.0 | 25.0 |
| ZnO | 5.0 | 5.0 | 5.0 | 5.0 |
| $Na_2O$ | 5.0 | 3.5 | 5.0 | 3.5 |

Tables IX and IXA show that replacing CaO with ZnO causes a reduction in the coefficient of thermal expansion of the glass as well as improving the alkali resistance thereof as has been illustrated above.

TABLE IX

|   | 37 | 38 | 35 |
|---|---|---|---|
| $SiO_2$ | 67.3 | 67.8 | 68.4 |
| CaO | 17.8 | 19.8 | 21.9 |
| ZnO | 12.23 | 9.6 | 6.91 |
| $Na_2O$ | 2.59 | 2.61 | 2.63 |
| $mg/cm^2$ | 0.03 | 0.04 | 0.06 |
| Exp. | 59.1 | 60.9 | 64.1 |

TABLE IXA

|   | 37 | 38 | 35 |
|---|---|---|---|
| $SiO_2$ | 67.0 | 67.0 | 67.0 |
| CaO | 19.0 | 21.0 | 23.0 |
| ZnO | 9.0 | 7.0 | 5.0 |
| $Na_2O$ | 5.0 | 5.0 | 5.0 |

Tables X and XA disclose that a small amount of $Al_2O_3$ can lead to a marked improvement in alkali resistance. For example, a comparison of Example 39 with Example 40 clearly evidences a significant improvement in alkali resistance when $Al_2O_3$ is substituted for $SiO_2$. A similar effect occurs when $Al_2O_3$ replaces some $SiO_2$ and alkali metal oxide, as is demonstrated through a comparison of Example 41 with Example 39. Examples 12 and 31 manifest a fivefold reduction in weight loss when $Al_2O_3$ is substituted for $Na_2O$ and CaO, and the $SiO_2$ value is maintained constant.

TABLE X

|  | 39 | 40 | 12 | 41 | 31 |
|---|---|---|---|---|---|
| $SiO_2$ | 65.3 | 64.0 | 66.5 | 64.4 | 66.5 |
| CaO | 19.7 | 19.8 | 23.9 | 19.7 | 22.9 |
| ZnO | 12.25 | 12.29 | 6.93 | 12.26 | 6.92 |
| $Na_2O$ | 2.59 | 2.60 | 2.64 | 2.34 | 2.37 |
| $Al_2O_3$ | — | 1.28 | — | 1.28 | 1.30 |
| $mg/cm^2$ | 0.05 | <0.01 | 0.05 | 0.02 | 0.01 |
| Op. Liq. | — | — | — | — | 1140 |

TABLE XA

|  | 39 | 40 | 12 | 41 | 31 |
|---|---|---|---|---|---|
| $SiO_2$ | 65.0 | 63.5 | 65.0 | 64.0 | 65.0 |
| CaO | 21.0 | 21.0 | 25.0 | 21.0 | 24.0 |
| ZnO | 9.0 | 9.0 | 5.0 | 9.0 | 5.0 |
| $Na_2O$ | 5.0 | 5.0 | 5.0 | 4.5 | 4.5 |
| $Al_2O_3$ | — | 1.5 | — | 1.5 | 1.5 |

Tables XI and XIA are designed to demonstrate the correlation which exists between the weight loss measurements and the above-described detergent test. Thus, glasses exhibiting a weight loss of 0.08 $mg/cm^2$ will sometimes demonstrate an "A" rating in the stain test. The loss of gloss observed on the top surface of the samples and the retention of gloss seen on the bottom surface of the samples can be explained in the following manner. The bottom refers to the surface of the sample which contacts the steel plate onto which the melt is poured to form glass patties. This surface is analogous to and would be expected to manifest properties similar to those noted on the surface of glass articles formed via a pressing operation. In contrast, the top surface cools slowly and is conjectured to have associated with it an exceptionally coarse phase separation. For whatever reason, the top surface exhibits a misleading high tendency to lose its gloss during the detergent test. The assumption that the bottom surface of the sample is the better indicator of properties is indicated by Example 46. Hence, discs pressed from a melt of that glass displayed no loss of gloss in spite of its similarity in composition to Example 42. In sum, glasses demonstrating a weight loss of no more than about 0.1 $mg/cm^2$ are reasonably likely to pass the detergent test where pressed articles are utilized. The samples were subjected to the stain test for 96 hours except where noted otherwise. Likewise, the gloss condition reflects a 96-hour immersion in detergent except where noted otherwise. "Top" refers to the top surface of the sample and "bottom" to the obverse surface. "Yes" indicates a significant loss of gloss whereas "no" signifies an essentially unchanged surface.

TABLE XI

|  | 42 | 43 | 44 | 45 | 46 | 47 |
|---|---|---|---|---|---|---|
| $SiO_2$ | 62.3 | 65.0 | 65.5 | 64.8 | 60.0 | 58.1 |
| CaO | 17.9 | 19.6 | 19.3 | 19.1 | 15.1 | 10.6 |
| ZnO | 6.49 | 6.77 | 6.82 | 6.75 | 9.37 | 6.15 |
| $Na_2O$ | 2.22 | 2.32 | 1.56 | 1.54 | 2.14 | 2.11 |
| $Al_2O_3$ | 1.22 | 1.28 | 1.28 | 1.27 | 1.17 | 1.15 |
| $Li_2O$ | — | — | 0.50 | 0.50 | — | — |
| MgO | — | 0.68 | 0.68 | 0.67 | — | — |
| SrO | — | 1.72 | 1.74 | 1.72 | — | 19.6 |
| BaO | 9.8 | 2.56 | 2.57 | 2.54 | 9.42 | 0.28 |
| F | — | — | — | 0.99 | 2.78 | 1.95 |
| $mg/cm^2$ | 0.08 | 0.06 | 0.06 | 0.06 | * | 0.10 |
| Stain | A | A | A | A | A | ** |
| Gloss |  |  |  |  |  |  |
| Top | Yes | Yes | Yes | Yes | No | Yes |
| Bottom | No | No | No | No | No | Yes |

*Pressed disc. No weight loss data obtained. By analogy to Example 42 estimated to be about 0.05 $mg/cm^2$.
**Test run only 24 hours because of severe loss of gloss.

TABLE XIA

|  | 42 | 43 | 44 | 45 | 46 | 47 |
|---|---|---|---|---|---|---|
| $SiO_2$ | 65.0 | 65.0 | 65.0 | 64.45 | 63.11 | 62.76 |
| CaO | 20.0 | 21.0 | 20.5 | 20.3 | 16.99 | 12.25 |
| ZnO | 5.0 | 5.0 | 5.0 | 4.95 | 7.28 | 4.90 |
| $Na_2O$ | 4.5 | 4.5 | 3.0 | 2.97 | 4.37 | 4.41 |
| $Al_2O_3$ | 1.5 | 1.5 | 1.5 | 1.49 | 1.46 | 1.47 |
| $Li_2O$ | — | — | 2.0 | 1.98 | — | — |
| MgO | — | 1.0 | 1.0 | 0.99 | — | — |
| SrO | — | 1.0 | 1.0 | 0.99 | — | 12.25 |
| BaO | 4 | 1.0 | 1.0 | 0.99 | 3.88 | — |
| F | — | — | — | 0.99 | 2.91 | 1.96 |

Tables XII and XIIA illustrate studies undertaken to investigate means for achieving a lower crystal liquidus temperature in the subject glasses without harming the alkali resistance thereof. The exemplary compositions reported demonstrate the effect resulting from mixing the alkaline earth metal oxides. As is evident, any decrease in liquidus temperature attributed to the entropy of mixing, when the alkaline earth metal oxides are combined, is virtually negligible compared to the direct influence of the ionic size of the individual alkaline earth metals. It should also be noted that the viscosity of the glasses tends to become independent of composition at very high temperatures. Consequently, any change in composition which reduces the liquidus temperature automatically increases the viscosity of the glass at the liquidus. Example 52 exhibits a desirably low liquidus temperature and high liquidus viscosity but, unfortunately, has unsatisfactory alkali resistance. ZnO can be added to improve alkali resistance but, as manifested in Table IV above, ZnO raises the liquidus temperature.

TABLE XII

|  | 48 | 49 | 50 | 51 | 52 | 53 | 54 |
|---|---|---|---|---|---|---|---|
| $SiO_2$ | 67.8 | 66.3 | 63.6 | 65.0 | 60.1 | 68.8 | 62 |
| MgO | 0.12 | 0.10 | 0.06 | 0.10 | 0.05 | 3.55 | 0.10 |
| CaO | 29.2 | 23.8 | 13.7 | 23.4 | 13.0 | 24.7 | 22.4 |
| SrO | — | — | — | 8.63 | 23.9 | 0.02 | 0.02 |
| BaO | — | — | — | 0.12 | 0.34 | — | 12.3 |
| ZnO | — | 6.91 | 19.88 | — | — | — | — |
| $Na_2O$ | 2.4 | 2.37 | 2.27 | 2.32 | 2.15 | 2.46 | 2.23 |
| $Al_2O_3$ | 0.44 | 0.43 | 0.42 | 0.42 | 0.40 | 0.45 | 0.41 |
| Cry. Liq. | 1380 | 1430 | 1475 | 1347 | 1245 | 1415 | 1290 |
| Viscosity |  |  |  |  |  |  |  |
| At Liq. | 100 | 80 | — | 140 | 400 | 100 | 200 |
| At 1430° C. | 65 | 80 | — | 55 | 52 | 80 | 80 |
| S.P. | 832 | 800 | 786 | 828 | 817 | 825 | 813 |

TABLE XIIA

|      | 48   | 49   | 50   | 51   | 52   | 53   | 54   |
|------|------|------|------|------|------|------|------|
| SiO2 | 64.9 | 64.9 | 64.9 | 64.9 | 64.8 | 65.0 | 64.9 |
| MgO  | 0.2  | 0.1  | 0.1  | 0.1  | 0.1  | 5.0  | 0.1  |
| CaO  | 29.9 | 25.0 | 15.0 | 24.9 | 15.0 | 25.0 | 25.0 |
| SrO  | —    | —    | —    | 5.0  | 15.0 | —    | —    |
| BaO  | —    | —    | —    | —    | 0.1  | —    | 5.0  |
| ZnO  | —    | 5.0  | 15.0 | —    | —    | —    | —    |
| Na2O | 4.5  | 4.5  | 4.5  | 4.5  | 4.5  | 4.5  | 4.5  |
| Al2O3| 0.5  | 0.5  | 0.5  | 0.5  | 0.5  | 0.5  | 0.5  |

Tables XIII and XIIIA point out that not only does the substitution of $TiO_2$ for $SiO_2$ not reduce the crystal liquidus temperature, but also that the substitution introduces color into the opal glass. The replacement of $SiO_2$ with $B_2O_3$ or $P_2O_5$ does not appear to endow the final glass with any advantageous properties.

TABLE XIII

|          | 55    | 56    | 57    | 58    | 59    | 60    | 12    |
|----------|-------|-------|-------|-------|-------|-------|-------|
| SiO2     | 66.4  | 61.5  | 63.9  | 60.9  | 60.8  | 63.4  | 66.5  |
| CaO      | 23.8  | 23.5  | 23.7  | 17.8  | 23.3  | 24.3  | 23.9  |
| ZnO      | 6.92  | 6.83  | 6.88  | 6.45  | 6.75  | 7.04  | 6.93  |
| Na2O     | 2.50  | 2.47  | 2.49  | 2.33  | 2.44  | 2.55  | 2.64  |
| TiO2     | —     | 5.36  | 2.70  | 2.53  | —     | —     | —     |
| Al2O3    | 0.22  | 0.21  | 0.24  | 0.20  | 1.91  | 0.20  | —     |
| BaO      | —     | —     | —     | 9.72  | —     | —     | —     |
| P2O5     | —     | —     | —     | —     | 2.36  | —     | —     |
| B2O3     | —     | —     | —     | —     | —     | 2.41  | —     |
| Color    | White | Purple| Tan   | Tan   | White | White | White |
| Cry. Liq.| 1420  | —     | 1415  | 1370  | 1355  | 1370  | 1300  |
| Gloss    |       |       |       |       |       |       |       |
| Top      | —     | —     | —     | —     | Yes*  | Yes*  | Yes** |
| Bottom   | —     | —     | —     | —     | Yes*  | Yes*  | No    |

*Test run only 24 hours because of severe loss of gloss.
**Poured patty surface. No loss of gloss with pressed discs.

TABLE XIIIA

|       | 55   | 56   | 57   | 58   | 59   | 60   | 12   |
|-------|------|------|------|------|------|------|------|
| SiO2  | 65.0 | 61.0 | 62.0 | 64.0 | 61.0 | 61.0 | 65.0 |
| CaO   | 25.0 | 25.0 | 25.0 | 20.0 | 25.0 | 25.0 | 25.0 |
| ZnO   | 5.0  | 5.0  | 5.0  | 5.0  | 5.0  | 5.0  | 5.0  |
| Na2O  | 4.75 | 4.75 | 4.75 | 4.75 | 4.75 | 4.75 | 5.0  |
| TiO2  | —    | 4.0  | 2.0  | 2.0  | —    | —    | —    |
| Al2O3 | 0.25 | 0.25 | 0.25 | 0.25 | 0.25 | 0.25 | —    |
| BaO   | —    | —    | —    | 4.0  | —    | —    | —    |
| P2O5  | —    | —    | —    | —    | 2.0  | —    | —    |
| B2O3  | —    | —    | —    | —    | —    | 4.0  | —    |

Whereas laboratory experience has indicated that very useful products can be secured from glasses consisting essentially of CaO, ZnO, and $SiO_2$ with, optionally, $Na_2O$, $Al_2O_3$, and/or F, the above Examples clearly indicate that minor additions of numerous compatible metal oxides are possible with little adverse and sometimes advantageous effects. Conventional glass colorants may also be included, if desired. The total of all such additions will desirably be held below about 10% by weight, however, except for SrO which may be included in levels up to about 20% by weight. Based upon all around property considerations, the more preferred glasses will consist essentially, expressed in terms of weight percent on the oxide basis, of 60–70% $SiO_2$, 20–30% CaO, 5–15% ZnO, 1.5–4% $Na_2O$, 0–2% $Al_2O_3$, and 0–3% F. Example 12 is deemed to be the most preferred composition. Electron micrographs of that glass in the opal state demonstrate that spherical amorphous droplets no larger than about 0.5 micron impart the opacity. Such small droplets will not constitute stress concentrating sites. Inasmuch as the alkali metal content of the inventive glasses is low, products made therefrom are quite useful in microwave applications.

I claim:

1. A spontaneous opal glass having a softening point in excess of 750° C., a coefficient of thermal expansion between about $60-90 \times 10^{-7}/°C.$, a crystal liquidus temperature below 1350° C., a viscosity at the liquidus temperature of at least 200 poises, excellent resistance to attack by alkalies, and wherein spherically-shaped, glassy droplets constitute the opal phase, said glass consisting essentially, expressed in terms of weight percent on the oxide basis, of about

| SiO2 | 50–72 | Na2O  | 0–8 |
|------|-------|-------|-----|
| CaO  | 10–40 | Al2O3 | 0–2 |
| ZnO  | 4–40  | F     | 0–5 |

2. A spontaneous opal glass according to claim 1 also containing up to 20% SrO.

3. A spontaneous opal glass according to claim 1 consisting essentially, expressed in terms of weight percent on the oxide basis, of

| SiO2 | 60–70 | Na2O  | 1.5–4 |
|------|-------|-------|-------|
| CaO  | 20–30 | Al2O3 | 0–2   |
| ZnO  | 5–15  | F     | 0–3   |

* * * * *